No. 874,596. PATENTED DEC. 24, 1907.
A. JANET.
PROCESS OF PRODUCING OXYGEN.
APPLICATION FILED MAY 14, 1904.
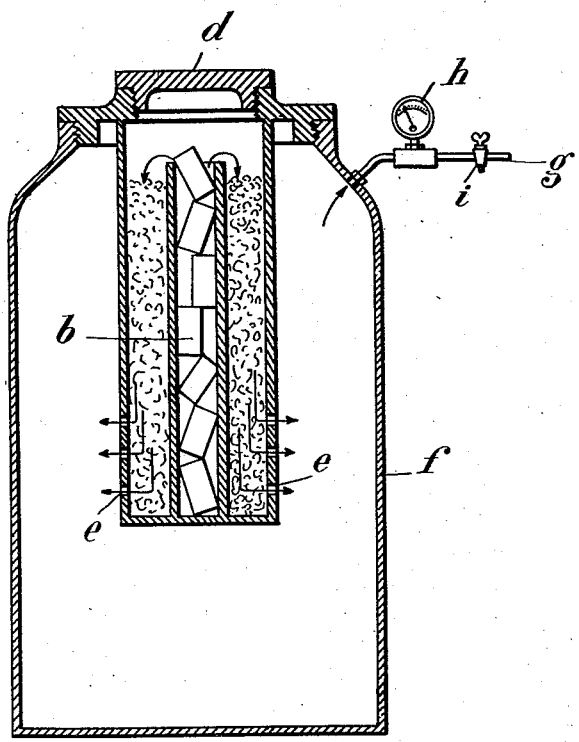
Witnesses:
Inventor:
Armand Janet.
By *H H de Vas*
Attorney.

UNITED STATES PATENT OFFICE.

ARMAND JANET, OF PARIS, FRANCE.

PROCESS OF PRODUCING OXYGEN.

No. 874,596.  Specification of Letters Patent.  Patented Dec. 24, 1907.

Application filed May 14, 1904. Serial No. 208,111.

*To all whom it may concern:*

Be it known that I, ARMAND JANET, a citizen of the French Republic, and resident at Paris, France, (and whose postal-office address is 282 Rue St. Jacques, Paris, France,) have invented new and useful Improvements in Processes of Producing Oxygen, of which the following is a specification.

Oxygen gas is obtained when certain salts such as chlorates, iodates, bromates, perchlorates etc., which contain a large amount of oxygen, are submitted to the action of heat. These same salts mixed with combustible elements such as coal saw-dust, petroleum residues etc., maintain the combustion of the latter in a very active manner, even in a closed vessel, as soon as the mixture has been lighted. If now we consider a mixture containing much more oxygenated salt than is necessary for producing the perfect combustion of a certain proportion of combustible material, a double phenomenon will take place. First. The combustible substance will be entirely burned with the aid of the oxygen yielded by a corresponding proportion of the oxygenated salt. Second. The heat developed by this combustion will cause the decomposition of the remainder of the oxygenated salt, the oxygen of which is thus set free. If now the mixture is introduced into a vessel which may be closed again at the moment of lighting, the oxygen will accumulate in this vessel under a pressure depending upon the quantity of this gas and the volume of the vessel.

In order for this process to be practical, it is necessary that the combustion of the above defined mixture have no explosive character at all; this result is obtained by adding to this mixture a sufficient quantity of an inert substance, such as finely powdered bricks, fine sand, clay, infusorial earth and the like. The mixture thus obtained may be advantageously molded into blocks having regular shapes and dimensions, each of which would be able to set free a determined quantity of oxygen. It is easy to purify this oxygen by separating it from the gaseous products (carbonic acid, water, etc.) of the reaction. In order to effect this it will suffice to cause the gas to pass for instance through a layer of lime which may be placed inside the apparatus.

The annexed drawing making a part of this specification shows a vertical axial section of the apparatus preferably used by me in carrying out such process, in a practical manner.

In this drawing $a$ is a receptacle or vessel receiving the blocks $b$, manufactured in the above stated manner; $c$ is another receptacle or vessel surrounding the vessel $a$ with which it communicates at its upper part. Both these vessels are closed by a cover $d$ when the blocks $b$ are lighted. The purifying lime is placed in vessel $c$ which is provided at its lower end with holes $e$ through which the purified oxygen escapes into a receptacle $f$, surrounding the vessels $a$ and $c$. Said receptacle $f$ is provided with a pipe $g$ through which the oxygen is passed and this pipe carries a manometer $h$ and a controlling cock $i$.

The gas produced in the inner vessel $a$ passes into the second vessel $c$ in the direction of the arrows, the gas then travels downward through this second vessel $c$ to escape through the holes $e$ into the outer vessel $f$; the pressure of the gas depending of course upon the volume of the apparatus and the quantity of gas produced.

The comminuted combustible material used to form the oxygen producing briquets may be any suitable carbonaceous material such as coal, sawdust, petroleum, residues, etc., and these materials are intimately mixed with a relatively large quantity of a highly chemically active salt or salts containing a large amount of oxygen such as chlorates, iodates, bromates, perchlorates and the like, all of which I consider equivalents, and the inert material may be finely powdered brick, sand, clay, infusorial earth, etc., also equivalents, it being of course self evident that refractory and not highly chemically active oxygen salts such as sulfates, nitrates, phosphates, etc., cannot when so treated give the result stated and required.

Having now described my invention, I claim:

1. The hereinbefore described process of producing oxygen which consists in commingling pulverized carbonaceous material, a highly chemically active oxidizing salt and comminuted inert refractory material, burning the mixture in a closed vessel and retaining the gas produced in a receiving vessel.

2. The hereinbefore described process of producing oxygen which consists in commingling a pulverized carbonaceous material, a finely comminuted highly chemically active oxidizing salt and finely pulverized inert refractory material, briqueting the mixture and burning the briquets in a closed chamber.

3. The hereinbefore described process of producing oxygen which consists in commingling pulverized carbonaceous material, pulverized highly chemically active oxidizing salts and finely comminuted inert refractory material, briqueting the mixture, burning the briquetes in a closed chamber and passing the products of combustion through the purifying materials.

4. The hereinbefore described process of producing oxygen which consists in commingling finely comminuted carbonaceous material, pulverized highly chemically active oxidizing salts and finely comminuted inert refractory material, briqueting the mixture, burning the briquets in a closed chamber and passing the products of combustion through a layer of lime.

5. The hereinbefore described process of producing oxygen, consisting in mixing a relatively small quantity of combustible comminuted carbonaceous material with a relatively large quantity of a potassium chlorate and finely powdered inert noncombustible material, this mixture being lighted and burned in a closed vessel and removing the carbon dioxid from the oxygen so produced.

6. The hereinbefore described process of producing oxygen, consisting in mixing a relatively small quantity of combustible comminuted carbonaceous material with a relatively large quantity of potassium perchlorate and finely powdered inert noncombustible material, this mixture being lighted and burned in a closed vessel and removing the carbon dioxid from the oxygen so produced.

In testimony whereof I have hereunto set my hand in presence of two witnesses.

ARMAND JANET.

Witnesses:
ADOLPHE STURM,
HANSON C. COXE.